US005153471A

United States Patent [19]

Ottersbach

[11] Patent Number: 5,153,471

[45] Date of Patent: Oct. 6, 1992

[54] POSITIONING AND LIMITING STRUCTURE FOR AN ELECTRIC MOTOR CENTRIFUGAL ACTUATOR

[75] Inventor: Thomas V. Ottersbach, St. Louis County, Mo.

[73] Assignee: Emerson Electric Co., St. Louis, Mo.

[21] Appl. No.: 701,523

[22] Filed: May 16, 1991

[51] Int. Cl.[5] .................... H02K 11/00; H01H 35/10; H01H 5/30

[52] U.S. Cl. ................................ 310/68 E; 200/80 R; 318/793

[58] Field of Search ................ 310/68 E; 73/538, 550; 200/80 R; 318/462, 793

[56] References Cited

U.S. PATENT DOCUMENTS

| | | | |
|---|---|---|---|
| 2,538,410 | 1/1951 | Bretch | 73/538 |
| 2,657,920 | 11/1953 | Harrison | 73/538 |
| 3,452,607 | 7/1969 | Rike | 73/538 |
| 4,208,559 | 6/1980 | Gray | 200/80 R |
| 4,289,988 | 9/1981 | Schaefer | 310/68 E |
| 4,661,732 | 4/1987 | Gehrt | 310/68 E |

FOREIGN PATENT DOCUMENTS

| | | | |
|---|---|---|---|
| 0745469 | 2/1956 | United Kingdom | 310/68 E |

*Primary Examiner*—Steven L. Stephan
*Assistant Examiner*—Clayton LaBalle
*Attorney, Agent, or Firm*—Polster, Lieder, Woodruff & Lucchesi

[57] ABSTRACT

A centrifugal actuator assembly adapted to be mounted on a rotatable shaft, the assembly including actuating levers responsive to the rotational speed of the shaft, guide means to guide the levers in a predetermined inward and outward path during movement between first and second spaced positions and positive positioning and limiting structure cooperative with the levers to positively position the levers for actuating operation and to limit their movement in the event of departure from such predetermined positively positioned path at both first and second spaced positions.

7 Claims, 2 Drawing Sheets

POSITIONING AND LIMITING STRUCTURE FOR AN ELECTRIC MOTOR CENTRIFUGAL ACTUATOR

BACKGROUND OF THE INVENTION

The present invention relates to a centrifugal actuator assembly and more particularly to a centrifugal actuator assembly for actuating a starting switch for energization and deenergization of the starting winding of an electric motor, including an improved arrangement for positively positioning the actuator assembly for moveable operation relative first and second preselected positions and for limiting movement beyond such first and second positions.

It is well known in the electric motor art to actuate a switch for selective energization of stator windings used to generate required suitable forces for rotating the rotor assembly associated with the stator for both "start" and "run" conditions. The switch to be actuated conventionally is operated by a centrifugal actuator assembly mounted on and rotatable with the rotor shaft of an electric motor, the inwardly-outwardly moving levers of the centrifugal actuator assembly being responsive to the speed of the rotor shaft upon which the centrifugal actuator is mounted. Many of these centrifugal actuator assemblies of the prior art have included spring biased, weighted levers with the weights being capable of moving outwardly by centrifugal force acting against the spring biasing to effect axial shifting movement of a portion of the centrifugal actuator from a first position to a second position with respect to the rotor shaft. This movement is linked to a switch leading to motor windings effecting "start" and "run" conditions of the motor. In U.S. Pat. No. 4,661,732, issued on Apr. 28, 1987 to Louis M. Gehrt, it was broadly recognized to provide limiting structure to interrupt and prevent further outward movement of the spring biased switch actuating levers of a centrifugal actuator assembly in the event of improper actuating operations, the interrupting arrangement provided including lever camming surfaces cooperatively positioned with respect to a stop ledge to engage the levers in further outward movement to ensure alignment and snug nesting of the levers with the stop ledge in the event of improper actuating operation of the centrifugal actuator assembly.

The present invention, recognizing the advantages of such a safety stop ledge and camming surface arrangement in centrifugal actuator assemblies, further recognizes that such past arrangements have served to accommodate and limit improper actuator operations at only one actuator position. In addition, the present invention further recognizes that past centrifugal actuator arrangements have often resulted in operating problems, and have been involved in maintaining consistent engagement between a switch plunger and the centrifugal actuator associated therewith. Recognizing these past problems, the present invention provides an improved limiting arrangement which not only ensures alignment and snug nesting of the centrifugal actuator levers at both position of the moving levers but also ensures a positive and proper location of the actuating levers to maintain a consistent preselected engagement between actuator and associated switch plunger.

The present invention not only recognizes these past problems in the art, but resolves the same with an efficient straightforward and economical apparatus which can be readily manufactured with a minimum of parts and assembled without sacrifice of a number of known structural features of past centrifugal actuators.

Various other features of the present invention will become obvious to one skilled in the art upon reading the disclosure set forth herein.

BRIEF SUMMARY OF THE INVENTION

More particularly the present invention provides an improved centrifugal actuator assembly adapted to be mounted on a rotatable shaft comprising: actuating lever means movably disposed relative the longitudinal axis of the shaft responsive to the rotational speed of the actuator assembly on the shaft for actuating movement of the lever means between first and second spaced positions relative the longitudinal axis of the shaft upon acceleration and deceleration of the actuator assembly; means for biasing the lever means to the first position; guide means including a carriage member moveable axially along the longitudinal axis of the shaft, the guide means to guide means and carriage member cooperating with the lever means to guide the moveable lever means in a preselected guide path between the first and second position during normal operations of acceleration and deceleration; and, means to positively position the carriage member and to limit movement of the lever means in either direction beyond the positively positioned first and second spaced positions relative the shaft.

It is to be understood that various changes can be made by one skilled in the art in one or more of the several parts of the inventive centrifugal actuator assembly without departing from the scope or spirit of the present invention.

BRIEF DESCRIPTION OF THE DRAWINGS

Referring to the drawings which disclose one advantageous embodiment of the present invention in views similar to those of FIGS. 1–4, 7 and 8 of aforementioned U.S. Pat. No. 4,661,732 and which incorporates the novel features of the present invention along with an additional perspective view of a portion of the carriage or slider and the guide therefore.

DETAILED DESCRIPTION OF THE INVENTION

Figure 1:
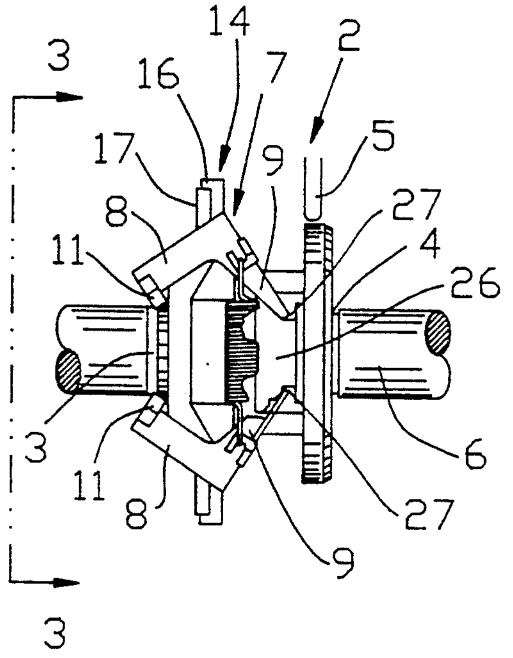
FIG. 1 is a partially broken away, side elevational view of the inventive switch actuator assembly mounted on a rotor shaft for rotation therewith, the actuating levers being shown in a spring biased inward or first position with a portion of the annular ring of the carriage or slider partially broken away to disclose one of the two stop pairs on the shaft mounted guide sleeve in nested engagement with the recessed annular ring or collar of the carriage.
Figure 2:
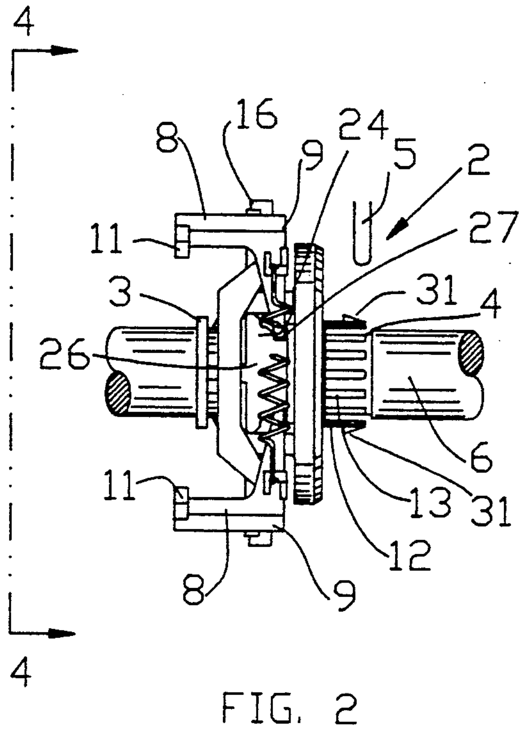
FIG. 2 is a side elevational view of the apparatus of FIG. 1, the actuating levers being shown in a centrifugally moved outward or second position, this FIG. 2 disclosing the nesting stop pair on the guide sleeve.
Figure 3:
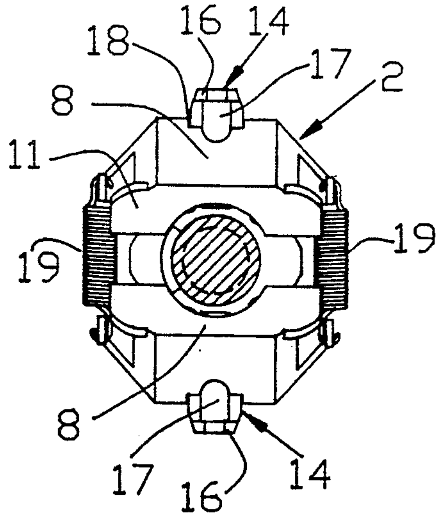
FIG. 3 is an end view of the apparatus as shown in FIG. 1, taken in a plane through line 3—3 in the direction of the arrows as shown in FIG. 1.
Figure 4:
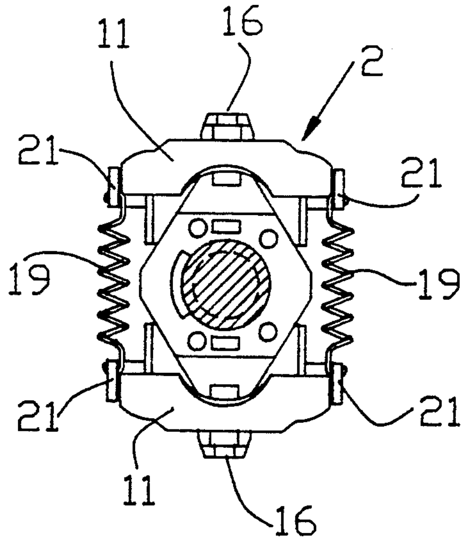
FIG. 4 is an end view of the apparatus as shown in FIG. 2 taken in a plane through line 4—4 in the direction of the arrows as shown with this line.

Referring to FIGS. 1-3 of the drawings, the inventive centrifugal actuator assembly 2 is shown as fixedly mounted between fixed stop collar 3 and groove 4 in the rotor shaft 6 of an electric motor (not shown) for rotation with shaft 6. It is to be understood that actuator assembly 2 can be linked to a suitable starting switch (also not shown) for energizing and deenergizing the starting windings of the electric motor.

Actuator assembly 2 includes a pair of similar actuating levers 7 positioned in mirror-image relation about rotor shaft 6. Each actuating lever 7 is of substantially L-shaped cross-section to include two leg portions, namely outwardly moveable or free leg portion 8 and pivotal or inner leg portion 9. A weighted element 11 is integral with and projects normal from the outer edge of free leg portion 8 and each leg portion is appropriately recessed along the center of their respective free ends for shaft clearance purposes.

A suitable guide means for actuating levers 7 in the form of a sleeve 12 fixedly mounted to rotor shaft 6 between stop collar 3 and groove 4 includes a split end 13 with the extremities adapted to fit into groove 4 and a pair of lever guiding track members 14 extending in opposed cantilevered relationship from the opposite end thereof so as to be substantially normal to the longitudinal, rotating axis of rotor shaft 6. Each track member 14 has a stop ledge or lip portion 16 at its extremity which extend normal therefrom to provide one of two pair of stops and is further provided with a longitudinally extending guide rib 17. These track members 14 are of preselected length, size and shape to extend through an aperture 18 disposed in levers 7 along the joined leg portions 8, 9 (FIG. 3). These apertures 18 conform with the cross-sectional contour of track members 14 to permit passage of these track members 14 therethrough when the leg portions 8, 9 are disposed at an angle to the longitudinal axis of the shaft with pivotal or inner leg portions 9 in their normal, biased pivot position, as will be described more fully hereinafter.

To bias the actuating levers 7 so that pivotal leg portions 9 are maintained in pivot position, a pair of coil springs 19 are disposed in spaced relation on opposite sides of shaft 6. The ends of these coil springs are connected to hooks 21 extending from leg portions 9.

To enhance the pivotal movement of actuating levers 7, a carriage or slider 22 is movably keyed to sleeve 12 by a pair of longitudinally extending ribs 20 projecting normally from opposite sides of sleeve 11 to engage in longitudinally extending recesses 25 in carriage or slider 22 for longitudinal slidable movement thereon and thus movement axially of rotor shaft 6. Carriage or slider 22 has an annular ring 23 at one end thereof extending normal to shaft 2 with shoulder means in the form of a collar 24 having a pair of opposed side flanks 26 extending normally from an annular ring 23. These side flanks 26 serve to provide pivot corners 27 for the free edges of pivotal or inner leg portions 9.

Figure 5:
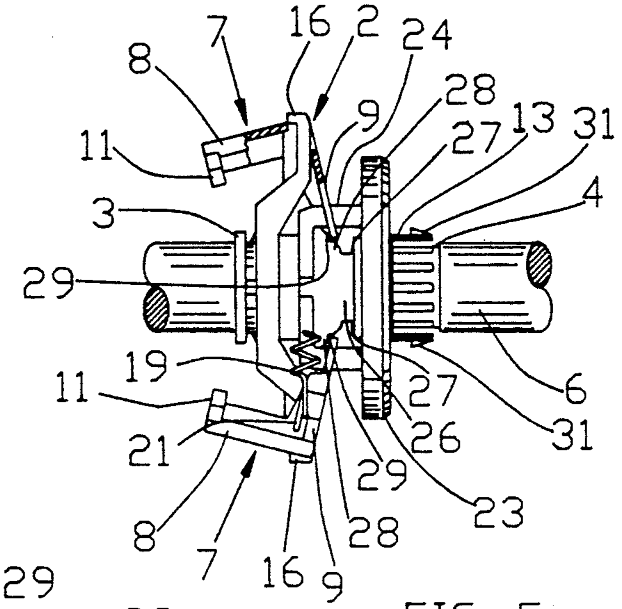
FIG. 5 is an enlarged, partially broken away side elevational view of the inventive actuator assembly, showing details of the actuating levers nesting between the other pair of two stop pairs and also showing ramp indentations when the levers depart from normal pivot nesting corners.
Figure 6:
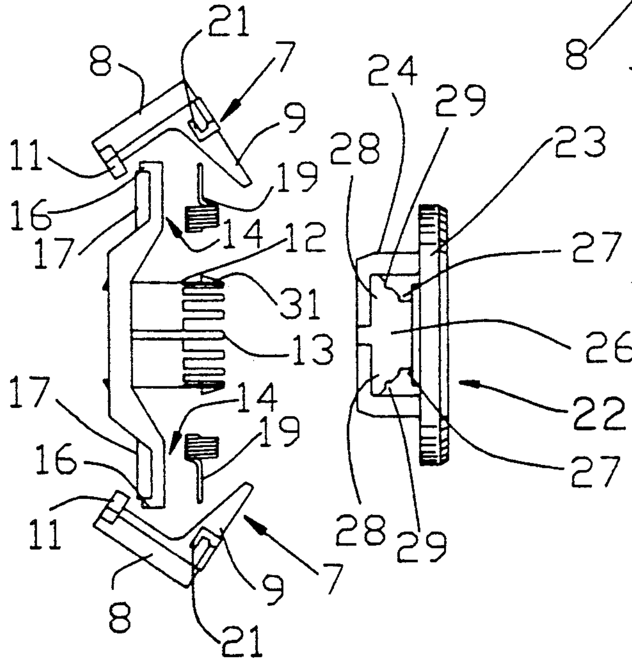
FIG. 6 is an exploded side view of the several parts of the inventive centrifugal actuator assembly; and, FIG. 7 is a perspective view of the annular ring portion of the carriage and a portion of the guide sleeve, disclosing the stop pair on the guide sleeve in alignment with the recesses in the annular ring or collar of the carriage.
Figure 7:
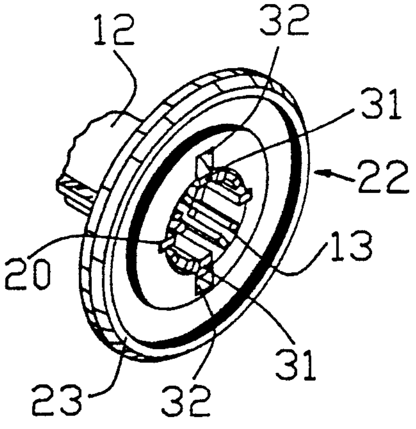

As can be seen in FIGS. 1 and 2 and more particularly in FIGS. 5 and 6, each of side flanks 26 on collar 24 of slider 22 is provided with camming means in the form of a pair of opposed inclined ramps 28 and each ramp 28 is, in turn, provided with an indentation 29. These ramp indentations 29 are so positioned or disposed relative aforedescribed stop ledges 16 on cantilevered track members 14 as to assure dropoff into indentations 29 of the pivot ends of leg portions 9 in the event of improper actuator operation and concomitant departure to ramps 28 of the pivot ends of spring biased leg portions 9 from their normal pivot corners 27, the leg portions 9 being oriented to snugly engage between the indentations 29 and the stop ledges 16 to thus interrupt and prevent further outward movement of the actuator levers 7.

In addition to the above described one of two pairs of stop ledges 16 at the extremities of lever guiding track members 14 and in accordance with the present invention, another spaced second pair of stop ledges 31 are provided on sleeve 12 to extend normally from the outer peripheral surface of sleeve 12 adjacent the splined extremity of sleeve 12. Advantageously, the pair of stop ledges 31 are each integral with and form a part of one of two opposed splines which are selectively of larger breadth than the other sleeve extremity splines therebetween to provide the desired strength to accommodate for those forces produced by coil springs 19 when carriage or slider 22 is returned to start position upon rotor shaft 6 deceleration. It is to be noted that it also has been determined advantageous to provide recesses 32 extending through a portion of the thickness of annular ring 23 of carriage or slider 22 to accommodate these stop ledges 31 therein in an aligning and space saving manner. These pair of ledges 31 and spaced pair of ledges 16 serve to limit movement of carriage or slider 22 between first and second preselected positions, ensuring a preselective positioning of the centrifugal actuator assembly at all times relative the switch to be actuated.

During normal actuator operation, the pair of ledges or stops 31 engage in recesses 32 of annular ring 23 of carriage 22, positioning carriage or slider 22 in a first position generally corresponding to the position shown in FIG. 1 with the switch plunger "5" in the "start winding" position. As rotor shaft 6 accelerates the "start winding" switch plunger "5" is disengaged with levers 7 pivoting about pivot corner 27 to the outward second or "run position" shown in FIG. 2. Should levers 7 have any tendency to continue outward movement due to acceleration, inner tips of levers 7 enter indentations 29 with the levers 7 rotating to engage against the pair of stop ledges 16 limiting movement and preventing disassembly of the actuator assembly at the second position. When the motor stops levers 7 are spring forced to return to the first, "start winding" position, by coil springs 19 with the tapered end of plunger "5" engaging the tapered camming surface adjacent the periphery of ring 23 to return to "start" position along the properly positioned ring 23, the pair of stop ledges 31 engaging in recesses 32 of annular ring 23 of carriage 22 ensuring such proper positioning in the first "start winding" position and preventing disassembly of the actuator assembly beyond the first position.

With this straightforward, economical and efficient stop arrangement at both first and second positions, further positioning and limiting is ensured.

The invention claimed is:

1. A centrifugal actuator assembly adapted to be mounted on a rotatable shaft comprising:

actuating lever means movably disposed relative the longitudinal axis of said shaft responsive to the rotational speed of said actuator assembly on said shaft for actuating movement of said lever means between first and second spaced positions relative the longitudinal axis of said shaft upon acceleration and deceleration of said actuator assembly;

means for biasing said lever means to said first position;

guide means mounted on said shaft and including a carriage member, said carriage member being moveable axially relative said longitudinal axis of said shaft, said guide means and said carriage member cooperating with said lever means to guide said movably disposed lever means in a preselected guide path between said first and said second positions during normal operations of acceleration and deceleration; and positioning means fixed to said guide means to positively position said carriage member and to limit movement of said lever means in either direction beyond said positively positioned first and second spaced positions relative said shaft.

2. The centrifugal actuator assembly of claim 1, said positioning means to positively position and limit movement of said lever means beyond said first and second spaced position including spaced stops preselectively positioned on said guide means and cooperable with said carriage member to positively position and limit said movement of said lever means in either direction beyond said first and second spaced positions relative said shaft.

3. The centrifugal actuator assembly of claim 1, said lever means being mounted on said carriage member to move therewith, said means to positively position and limit movement of said lever means beyond said first and second spaced positions including spaced stops integral with said guide means with one stop engageable against said carriage member to positively position and limit movement thereof in one direction and the other stop engageable against said lever means to limit movement in the other direction.

4. The centrifugal actuator assembly of claim 1, said actuating lever means including a pair of actuating levers disposed on opposite sides of said longitudinal axis of said shaft.

5. The centrifugal actuator assembly of claim 1, said guide means including a sleeve fixedly mounted to said rotatable shaft for rotation therewith, said sleeve having at least one guide track member extending in cantilever fashion from one end thereof substantially normal to the longitudinal axis of said shaft; said positioning means fixed to said guide means to positively position and limit movement of said lever means in either direction beyond said first and second position comprising at least two spaced stops on said guide means in the form of spaced stop ledges one of which projects substantially normal from the cantilevered extremity of said track member to directly engage said movably disposed actuating lever means to limit movement of said lever means in one direction and the other of which spaced stop ledges projects substantially normal from the other end of said sleeve to directly engage against said carriage member cooperable with said lever means to positively position and limit movement of said lever means in the other direction.

6. The centrifugal actuator assembly of claim 5, said carriage member having a recess therein to nestingly receive and engage against said other of said spaced stop ledges.

7. In an electric motor having a starting winding, a starting switch for energizing and deenergizing the starting winding, a rotor shaft, and a centrifugal actuator assembly for actuation of said starting switch, said centrifugal actuator assembly comprising;

a pair of actuating levers of mirror-image substantially L-shaped cross-section, the leg portions of which are centrally recessed adjacent their free edge portions with each lever having an aperture disposed therein along the joined leg portions;

guide means including a sleeve fixedly mounted to said rotor shaft for rotation therewith, said sleeve having lever guiding track members extending in opposed cantilevered relationship from one end thereof so as to be substantially normal to the longitudinal axis of said shaft, each track member at one end of said sleeve having a stop ledge projecting substantially normal therefrom at the cantilevered extremity thereof, said track members each being of preselected length, size and shape relative said corresponding aperture in said actuating lever to pass therethrough when the leg portions of said actuating levers are each disposed at an angle to the longitudinal axis of said shaft;

a pair of coil springs disposed in spaced relation on the opposite sides of said shaft with the ends thereof connecting opposed leg portions of said mirror-image actuating levers to bias said actuating levers to an angled first position;

a slider carriage mounted in keyed, slidable relation on said sleeve of said guide means for movement axially of said shaft, said slider carriage having a normally extending annular ring at one end thereof and shoulder means extending normally from said ring to provide nesting corners for the spring biased mirror-image leg portions of said actuating levers during normal pivotal actuating movement thereof with the other leg portion of each lever being centrifugally moved outwardly by the accelerated speed of said rotor shaft;

camming means including inclined ramps mounted on said shoulder means adjacent said nesting corners; said ramps having indentations therein, said indentations being disposed relative said stop ledge projections at the extremities of said cantilevered track members to assure drop-off of said biased leg portions of said actuating levers and snug nesting alignment of said actuating levers between said stop ledge projections on said track members and said indentations in the event of improper actuator operation and concomitant departure of the leg portion of each actuating lever from its nesting corner about which said leg portion normally pivots in its preselected guide path limiting movement of each actuating lever in one direction; and, stop ledge projections on said sleeve periphery projecting substantially normal therefrom at the other end of said sleeve opposite the end from which said track members extend, said sleeve stop ledge projections positively positioning and limiting movement of said annular ring of said slider carriage to thus positively position and limit movement of each actuating lever in the other direction in the event of improper actuator operation; said annular ring having recesses therein to nestingly receive and engage said stop ledge projections on said sleeve.

* * * * *